United States Patent
Nakai

(10) Patent No.: US 8,503,154 B2
(45) Date of Patent: Aug. 6, 2013

(54) CHARGE SUPPLIER

(76) Inventor: Tooru Nakai, Warabi (JP)

( * ) Notice: Subject to any disclaimer, the term of this patent is extended or adjusted under 35 U.S.C. 154(b) by 0 days.

(21) Appl. No.: 13/201,995

(22) PCT Filed: Feb. 15, 2010

(86) PCT No.: PCT/JP2010/052233
§ 371 (c)(1),
(2), (4) Date: Aug. 17, 2011

(87) PCT Pub. No.: WO2010/095606
PCT Pub. Date: Aug. 26, 2010

(65) Prior Publication Data
US 2012/0039012 A1 Feb. 16, 2012

(30) Foreign Application Priority Data

Feb. 17, 2009 (JP) .................................. 2009-033426

(51) Int. Cl.
*H05F 3/00* (2006.01)
(52) U.S. Cl.
USPC ........................................... 361/216; 361/226
(58) Field of Classification Search
USPC .................... 361/212, 213, 215–219
See application file for complete search history.

(56) References Cited

U.S. PATENT DOCUMENTS

| | | | | |
|---|---|---|---|---|
| 2,907,923 A | * | 10/1959 | Short | 361/215 |
| 3,171,813 A | * | 3/1965 | Inoue | 438/469 |
| 3,585,448 A | | 6/1971 | Simons | |
| 3,597,668 A | * | 8/1971 | Yoshimine | 361/225 |
| 3,679,453 A | * | 7/1972 | Nobuyuki et al. | 430/118.4 |
| 3,779,749 A | * | 12/1973 | Sato | 430/31 |
| 4,316,231 A | | 2/1982 | Michel | |
| 4,491,894 A | | 1/1985 | Pitts | |
| 4,514,273 A | * | 4/1985 | Vollman | 204/196.32 |
| 2007/0115605 A1 | * | 5/2007 | Pekkarinen et al. | 361/220 |
| 2008/0261419 A1 | * | 10/2008 | Martin et al. | 439/105 |
| 2009/0284888 A1 | * | 11/2009 | Bartel et al. | 361/118 |

FOREIGN PATENT DOCUMENTS

| | | |
|---|---|---|
| CN | 101513134 A | 8/2009 |
| DE | 10200292 A1 | 4/2003 |
| JP | H05-296909 | 11/1993 |
| JP | 2004-316477 | 11/2004 |
| JP | 2005-332709 A | 12/2005 |

(Continued)

OTHER PUBLICATIONS

European Patent Office, "Supplementary European Search Report" for EP 10 74 3732, Jul. 17, 2012.

*Primary Examiner* — Jared Fureman
*Assistant Examiner* — Terrence Willoughby
(74) *Attorney, Agent, or Firm* — Manabu Kaneseaka

(57) ABSTRACT

A charge supplier improves an electrically charged state of a vehicle or the like by allowing any part of the vehicle, such as an engine and electrical equipments, to maintain its movements. A charge supplier includes a plurality of rectangular tablet-like germanium chips bonded to a copper plate using a conductive adhesive, and a copper tape folded to sandwich the copper plate, so that the germanium chips are provided between the copper plate and the copper tape. The copper tape may be secured to the copper plate by pressing the copper tape toward the copper plate to deform the copper tape, or by using a conductive adhesive. An attaching terminal is provided in the copper plate on the side of the opening of the copper tape which is folded in a shape of "U".

15 Claims, 6 Drawing Sheets

FOREIGN PATENT DOCUMENTS

| | | |
|---|---|---|
| JP | 3119929 | 2/2006 |
| JP | 2007-080805 A | 3/2007 |
| JP | 2007-319549 | 12/2007 |
| JP | 2008-231390 | 10/2008 |
| JP | 2009-181694 | 8/2009 |
| WO | WO 2008032643 | 3/2008 |

* cited by examiner (A)

(B)

(C)

(D)

(A)

(B)

(C)

(D)

(A)

(B)

(A)

(B)

(C)

CHARGE SUPPLIER

TECHNICAL FIELD

The present invention relates to a charge supplier which can effectively be used with an automobile, vessel or the like.

BACKGROUND ART

An automobile is provided with a battery as a power source, and the battery can be recharged by means of a generator in the automobile. Referring to FIG. 6, there is shown a basic electrical connection diagram, according to which, a positive side of a battery 900 is electrically connected with an electrical equipment 910 which includes air-conditioner, headlights, and audio, for example, whereas a negative side of the battery 900 is electrically connected with an engine 920. Further, the electrical equipment 910 is shown to be at the negative side thereof electrically connected with a vehicle body 930 (body of automobile), while the afore-said engine 920 and vehicle body 930 are shown to be grounded. It is seen from the diagram that a direct current is supplied from the positive side of the battery 900 to the electrical equipment 910 and then passes through the vehicle body 930 and engine 920 to reach the negative side of the battery 900.

The foregoing arrangement certainly establishes a ground for the automobile or vehicle, though either the engine 920 or the vehicle body 930. But, such grounding may not completely allow sufficient flow of electric current to a ground, which will result in a whole of the vehicle body being still electrically charged, thus raising the problem that a noise may be generated in audio device, or firing of engine may not be done satisfactorily, for instance.

Solution to the problem stated above can be found from the under-mentioned patent-related document 1 titled "Earthing System and Earthing Method". According to that literature, a negative terminal of battery and an engine ignition system are electrically connected together by use of an earth cable which is composed of complex line formed by a plurality of thin wires.

PRIOR-ART LITERATURE

Patent-Related Document

Patent-related document 1 : Laid-Open Patent Publication No. 2004-316477

SUMMARY OF THE INVENTION

Problems to be Solved by the Invention

The above-stated background art, however, can only improve a conduction of electricity between the battery and engine (which means reduction of resistance therebetween) and therefore such arrangement does not provide any improvement to electrical conduction among the electrical component, battery and ground, as a result of which, even if this prior-art earthing system is applied to a vehicle, it may not be possible to lessen the electrically charged state of a whole of the vehicle to a satisfactory low level.

A problem of this kind has been found in an engine, for example. The engine has pistons that are subjected to reciprocating motion, which causes friction in the engine to generate triboelectricity (static electricity), whereupon metallic regions in the engine becomes negatively charged, while on the other hand, oil regions therein becomes positively charged. During the piston movement, referring again to FIG. 6, it is to be understood that a negative charge taken from the negatively-charged metallic regions of the engine is moved through the shown leads to the positive terminal of the battery 900. But, in the illustrated diagram, there is no point to which positive charge will be attracted and moved, with the result that a positive charge taken from the positively-charged oil regions of the engine 920 still keeps its positive state and attempts to attract any surrounding negative charge. This eventually impedes passage of current from the engine 920 to the negative terminal of the battery 900. Further, tires of automobile have also been with the problem of this kind. Namely, during running of the automobile on a road, a friction is created between the tires and a surface of the road, so that the surface of road becomes negatively charged, while a side of tires (including wheels) becomes positively charged. Also, during that running of automobile, a braking system or brakes operated in the automobile causes friction therein to generate static electricity, which is a factor for keeping the side of tires in a positively charged state. Thus, as similar to the above-stated problem with the engine, the positive charge taken from the side of tires also attempts to attract any surrounding negative charge, which turns out to impede passage of current from the vehicle body to the negative terminal of the battery.

With the afore-stated problems in view, it is a purpose of the present invention to provide a charge supplier which is capable of lessening an electrically charged state of vehicle or the like so effectively that any associated part of the vehicle, including engine and electrical equipments, can keep on its operation smoothly and constantly.

Means for Solving the Problems

In accordance with the present invention, there is provided a charge supplier for discharging a negative charge therefrom, which is characterized in that a semiconductor chip(s) is/are provided so as to be sandwiched between conductive elements; and also characterized by having an attaching terminal provided therewith. As one aspect of the invention, the charge supplier may be characterized in that a semiconductor chip(s) is/are provided to a mounting/ connecting element. As another aspect of the invention, the charge supplier may be characterized in that a conductive element with a semiconductor included therein is provided so as to extend from a mounting/connecting element, such that said semiconductor is immersed in an electrically charged liquid. Further, according to one variant of principal modes of the invention, the afore-said mounting/connecting element includes bolt, nut and cap. Still further, according to another modes of the invention, the afore-said semiconductor(s) is/are either germanium or a germanium covered with lead.

Advantageous Effects of the Invention

In accordance with the present invention, a semiconductor, such as germanium, or a combination of the semiconductor and conductive element, is provided, from which a negative charge is discharged, whereby the negative charge counteracts a positive charge taken from a positively charged side, thereby lessening an electrically charged state to a favorable low level. With such action and effect, it is possible to reduce a charge-causing malfunction of any associated component part including engine and electrical equipment, wherein the malfunction occurs due to the component part becoming electrically charged. Thus, in the present invention, the component part can execute its normal operation in a smooth manner.

MODE FOR CARRYING OUT THE INVENTION

Hereinafter, several preferred and optimum modes of the present invention will be described in detail, based on exemplary embodiments to be set forth below.

Embodiment 1

Figure 1:
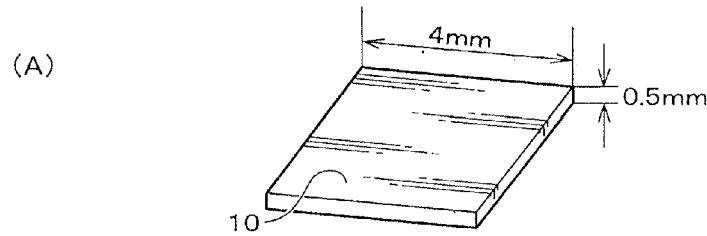
[FIG. 1] provides views showing a charge supplier according to Embodiment 1 of the present invention.
Figure 1:
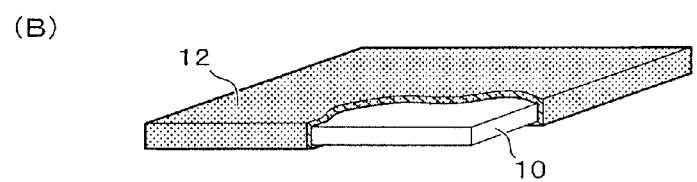
Figure 1:
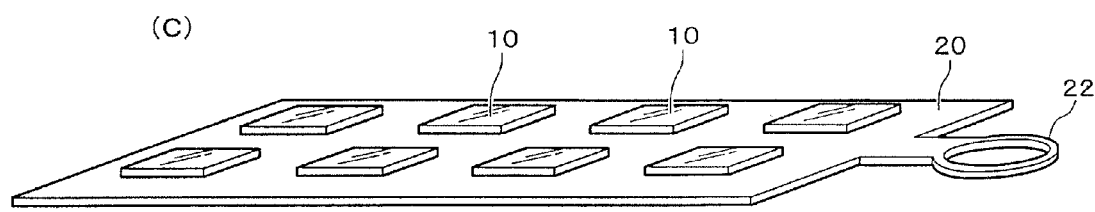
Figure 1:
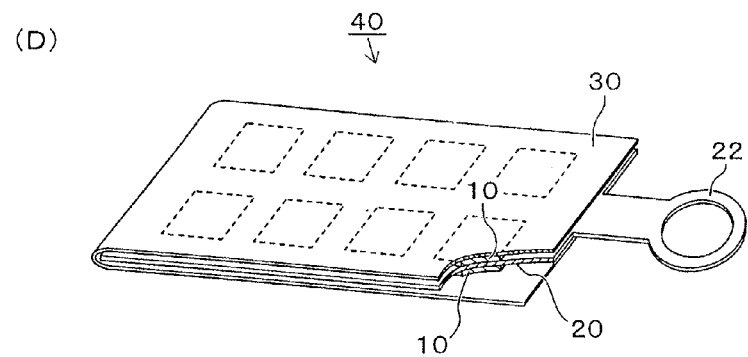

First of all, referring to FIGS. 1 and 2, a description will be made of an Embodiment 1 of the present invention. According to this embodiment, as shown in FIG. 1(A), a germanium chip 10, formed in a rectangular tablet shape, is employed. The germanium chip 10 is apt to breakage and splinter when an impact or load is applied thereto, and therefore, in order to prevent such breakage and splinter, it is recommended that the germanium chip 10 be enclosed or covered with a lead 12, as indicated in FIG. 1(B), for example. As shown in FIG. 1(C), a plurality of such germanium chips 10 may be fixedly secured on a copper plate 20 by means of an adhesive or the like. (As can be seen in the FIG. 1, the germanium chips are secured on both two opposite surfaces of the copper plate.) Note that the adhesive used is of an electrically conductive property. Then, as shown in FIG. 1(D), a copper tape 30 is folded so that the copper plate 20 is sandwiched therebetween, with the plurality of germanium chips 10 interposed between the two half portions of the thus-folded copper tape 30. In that way, a charge supplier 40 is formed. In this regard, securing the copper tape 30 to the copper plate 20 may be done under a method whereby the copper tape 30 is pressured against the copper plate 20 so as to be deformed thereon and thereby securely attached to the copper plate 20, or under another method whereby the copper tape 30 is securely adhered to the copper plate 20 by use of an adhesive of electrically conductive property. The copper plate 20 has an attaching terminal 22, and since the folded copper tape 30 stated above assumes a substantially "U" shape having an opened side defined opposite to the folded end thereof, the attaching terminal 22 is therefore disposed on such opened side of the folded copper tape 30.

Figure 2:
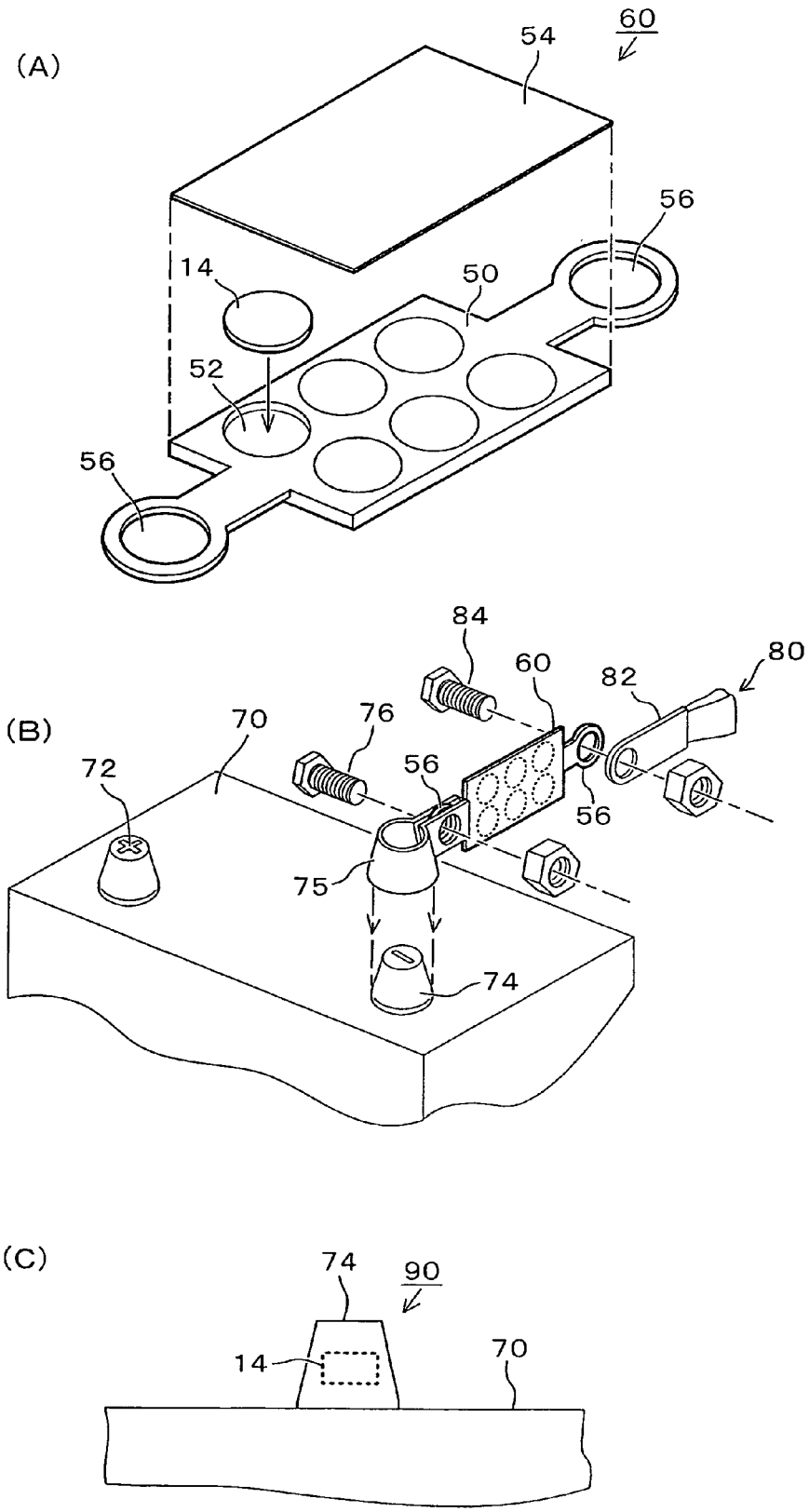
[FIG. 2] provides views showing another modes of charge suppliers according to the Embodiment 1 of the present invention.

FIG. 2 shows another variant of the present embodiment, according to which, a charge supplier 60 is provided, which is formed by: a copper base plate 50 having a plurality of recessions 52 formed in the principal surface thereof, such plurality of recessions being adapted for allowing germanium chips 14 to be inserted and placed therein, respectively, wherein, as illustrated, the germanium chips 14 are respectively placed in the recessions 52; and a cover 54 which is attached on the copper base plate so as to overlie the germanium chips. In assembly, those copper base plate 50, germanium chips 14 and cover 54 may be securely connected together by any suited means including bolts and nuts or an electrically conductive adhesive. The copper base plate 50 has two attaching terminals 56 defined in the respective two ends thereof.

FIG. 2(B) shows an example wherein the afore-said charge supplier 60 is attached to a battery 70. The battery 70 has a positive terminal 72 and a negative terminal 74. Certainly, attaching the charge supplier 60 to any one of those two terminals may be done as desired, but it is preferred on a priority basis that the charge supplier 60 be attached to the negative terminal 74. In other words, one of the afore-said two terminals 56 of the charge supplier 60 may be sandwiched between two end portions of a metallic connector 75 (i.e. a terminal) and then a bolt and nut means 76 be used to securely engage that metallic connector 75 with the negative terminal 74. On the other hand, the other of the two terminals 56 of the charge supplier 60 be securely fastened to a terminal 82 of a cable 80 by bolt and nut means 84, wherein the cable 80 is adapted for electrical connection with an engine and/or a vehicle body. In this regard, if it is desired to attach the previously described embodiment shown in FIG. 1 to the battery, both two different terminals 22 and 82 respectively of the charge supplier 40 and cable 80 may be fastened to the metallic connector 75 all together by the bolt and nut means 76.

FIG. 2(C) shows another charge supplier 90 which is formed by embedding the germanium chip 14 in the negative terminal 74 of the battery 70 stated above.

Now, a description will be made of practical actions of the foregoing embodiments of the present invention. As described earlier, due to frictions created in the engine and tires, any associated part and element, including an engine oil and a wheel in tire, becomes positively charged. But, in accordance with the embodiments described above, any one of the charge suppliers 40, 60 and 90 may be attached to the negative terminal 74 of the battery 70, so that a negative charge will be discharged from the charge supplier. Hence, such negative charge, discharged from one of the three charge suppliers 40, 60 and 90, in effect attracts a positive charge taken from the side inclusive of the engine and wheel, whereupon neutralization of the positive charge occurs, so that the electrically charged state is lessened satisfactorily.

With the above-described effects, in the case of the engine for example, the positively charged state of oil therein can be eliminated, whereby a load caused by the electrical charge against pistons in the engine is decreased to thereby achieve smooth reciprocating motion of the pistons. This in turns increases an output of the engine. Further, in addition to the engine oil, the foregoing embodiments can also be applied to transmission oil, differential gear oil and the like, so that the electrically charged state of each of those oils can be lessened satisfactorily in the same manner as described above, thereby achieving smooth operation of transmission, differential gears and other associated mechanical parts.

Additionally, in accordance with the embodiments described above, it is possible to extend a life of the battery 70. In the case of the battery being a lead-acid battery, it is known that repeated charge and discharge of the battery causes sulfation (creation of lead sulfate, $PbSO_4$) therein, which degrades the performance of the battery. But, as understandable from the descriptions above, any of the embodiments of the present invention can realize smooth passage of current from the positive to negative terminals of the battery 70. With such smooth current flow, a sulfation or lead sulfate being precipitated in the battery becomes decomposed and dissolved in electrolytic solution therein satisfactorily, so that crystallization and hardening of the lead sulfate is decreased, hence making it possible to extend a life of the battery.

Table 1 below indicates data of results obtained from an actual experiment for driving a car provided with the charge suppliers shown in FIG. 2. In this experiment, a car "Legend" made by Honda in 1989 was used, with the charge supplier 60 attached to a battery in that car as shown in FIG. 2. During running of the Legend, the fuel efficiency or gas mileage thereof was determined. As a result thereof, as indicated in the Table 1, before attaching the charge supplier 60 to the battery; a mileage per liter of gasoline, obtained during travel of the car on an ordinary road, was 5.5 [km], while on the other side, after attaching the charge supplier to the battery, a mileage per liter of gasoline, obtained during travel of the car on the same ordinary road, was increased to as long as 6.8 [km], hence providing 24% mileage buildup rate (or mileage increase rate). Also, the experiment was conducted for an expressway, and the table shows that, before attaching the charge supplier 60 to the battery; a mileage per liter of gasoline, obtained during travel of the car on the expressway, was 10.0 [km], while on the other side, after attaching the charge supplier to the battery, a mileage per liter of gasoline, obtained during travel of the car on the same expressway, was increased to as long as 12.0 [km], hence providing 20% mileage buildup rate.

TABLE 1

| | BEFORE ATTACHING CHARGE SUPPLIER | AFTER ATTACHING CHARGE SUPPLIER | MILEAGE BUILDUP RATE |
|---|---|---|---|
| ORDINARY ROAD | 5.0 | 6.8 | 24% |
| EXPRESSWAY | 10.0 | 12.0 | 20% |

Honda Legend made in the year 1989

Embodiment 2

Figure 3:
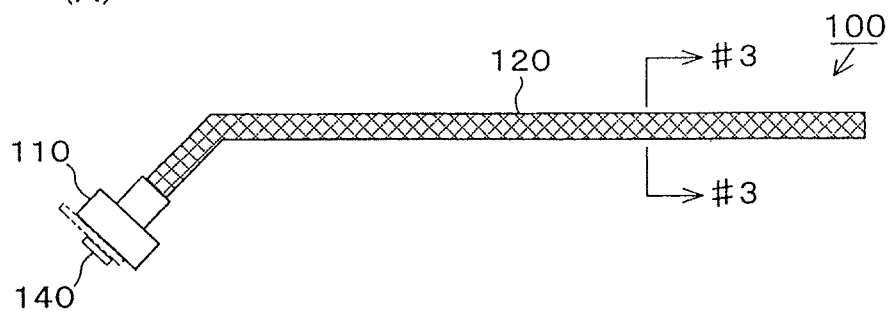
[FIG. 3] provides views showing charge suppliers according to Embodiment 2 of the present invention.
Figure 3:
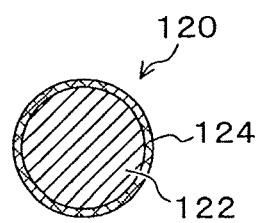
Figure 3:
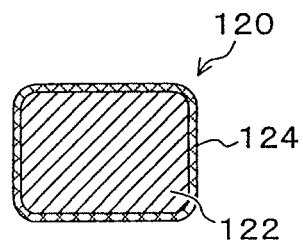
Figure 3:
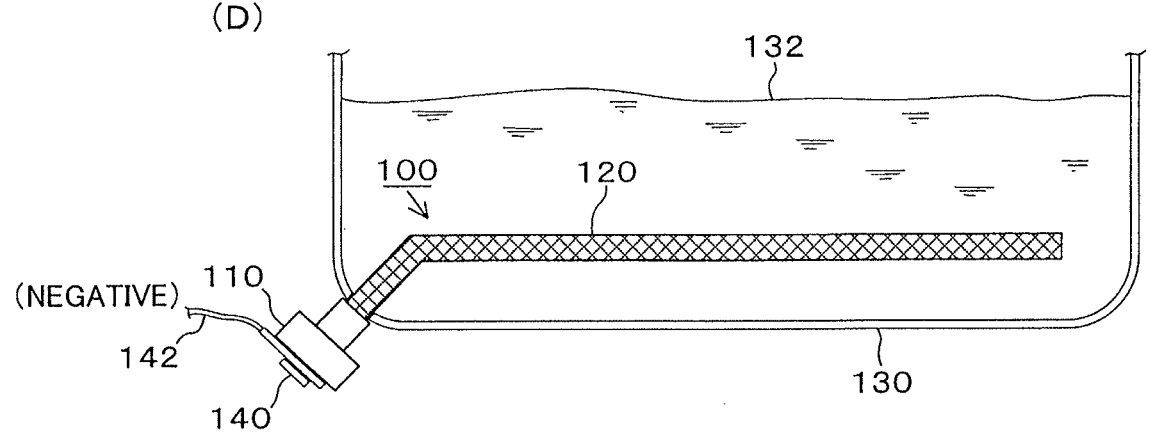

Next, with reference to FIG. 3, a description will be made of a second embodiment of the present invention. In this embodiment 2, there is provided another mode of charge supplier 100 comprising: a drain plug 110 (or drain bolt) adapted for allowing an engine oil to be drained from an oil pan in which the engine oil is stored; and a germanium bar 120 provided to the drain plug 110. The illustrated germanium bar 120 is of a partially bent shape, but may not be bent at all. A sectional view of the germanium bar 120 is given in FIG. 3(B). Namely, as shown in the sectional view of FIG. 3(B) which is viewed along the line #3-#3 in FIG. 3(A) and in the arrow direction of that line (i.e. a section of the germanium bar as viewed crosswise to the longitudinal direction thereof), the germanium bar 120 comprises a germanium film 124 and a conductive core element 122 covered with that germanium film as by plating. In this regard, the sectional configuration of the germanium bar may be defined in any desired shape, and for example, the germanium bar may be of a rectangular shape in section as shown in FIG. 3(C). Further, the core portion of the germanium bar 120 may be made of germanium, while the outer portion of that germanium bar be formed by an electrically conductive element. Or, a germanium be embedded in an electrically conductive element to form the germanium bar.

The germanium bar 120 may be fixedly attached to the drain plug 110 by a suitable connecting means such as welding or an adhesive of electrically conductive property. Or alternatively, the drain plug 110 and germanium bar 120 may be constructed together in an integral manner.

The charge supplier 100, which may be constructed in any one of the various modes stated above, is securely mounted on the oil pan 130 via the drain plug 110, as shown in FIG. 3(D), so that the germanium bar 120 is immersed in an oil 132. With such arrangement, even if one or both of the oil pan 130 and oil 132 become positively charged, a positive charge taken from such oil pan and oil is attracted by a negative charge being supplied from the charge supplier 100, so that the positively charged state of the oils is lessened, or, if condition permits, the positive charge can be neutralized.

In this context, as shown in FIG. 3(A), a screw 140 may be provided in the top portion of the drain plug 110, and as shown in FIG. 3(D), a cable 142 which electrically leads to the negative terminal of the battery 70 may be connected to that screw 140. This arrangement effectively promotes reduction of the positive charge taken from the positively-charged oil pan 130 and oil 132

Embodiment 3

Figure 4:
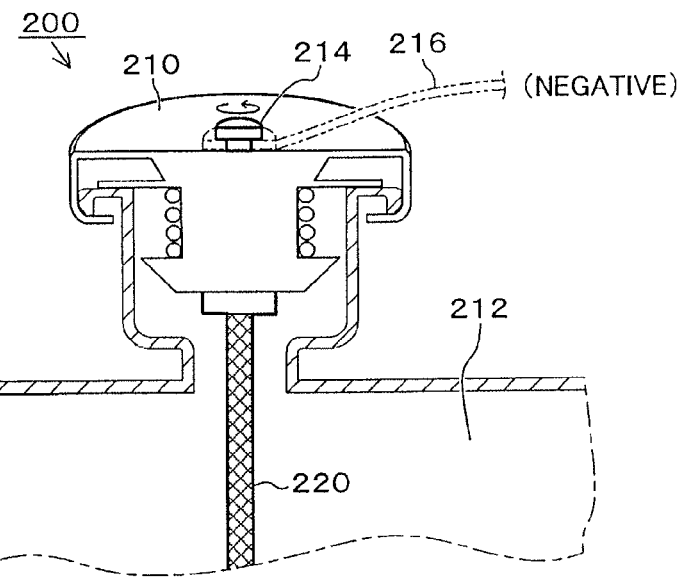
[FIG. 4] provides diagrams showing a charge supplier according to Embodiment 3 of the present invention.
Figure 4:
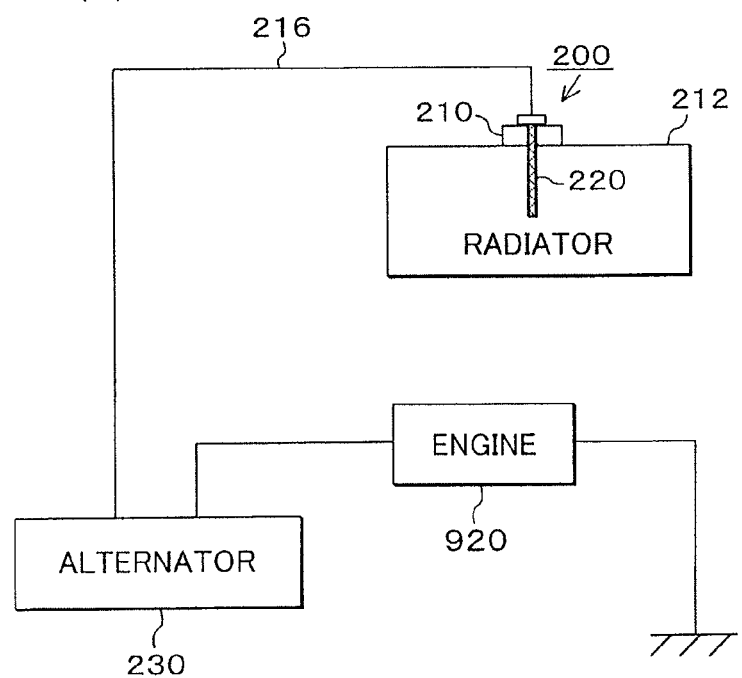

Reference being now made to FIG. 4, a third embodiment of the present invention will be described. In this embodiment 3, there is shown another mode of charge supplier 200 which comprises a radiator cap 210 and a germanium bar 220 provided to a protrudent distal end of that radiator cap. Note that the germanium bar 220 is constructed in the same manner as described in the foregoing embodiment shown in FIG. 3. As shown, the radiator cap 210 is securely mounted on a radiator 212, so that the germanium bar 220 is immersed in a coolant water within the radiator 212. Hence, this arrangement can reduce positive charge in the radiator in substantially the same manner as in the foregoing second embodiment. Also, likewise as in the foregoing embodiment, the present embodiment may be arranged such that a screw 214 is securely mounted in the top portion of the radiator cap 210, while being connected with a cable 216 which electrically leads to the negative terminal of the battery 70.

FIG. 4(B) shows an example wherein the afore-said cable 216 is electrically wired to a ground side through an alternator (or generator) 230 and an engine 920, wherein the ground side refers to the negative terminal of the battery 70. The alternator 230 has an outer housing which is electrically negative, and such outer housing is electrically connected with the engine 920. Therefore, the cable 216 can be connected to a screw portion provided in that outer housing of the alternator, thereby establishing electrical connection of the afore-said radiator cap 210 with the negative terminal of the battery 70.

Embodiment 4

Figure 5:
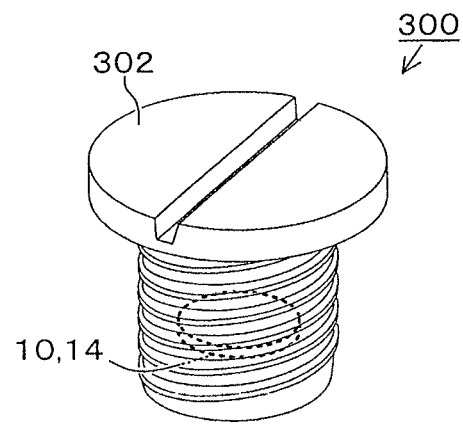
[FIG. 5] provides views showing charge suppliers according to Embodiment 4 of the present invention.
Figure 5:
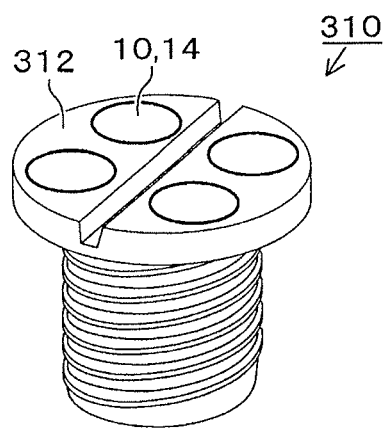
Figure 5:
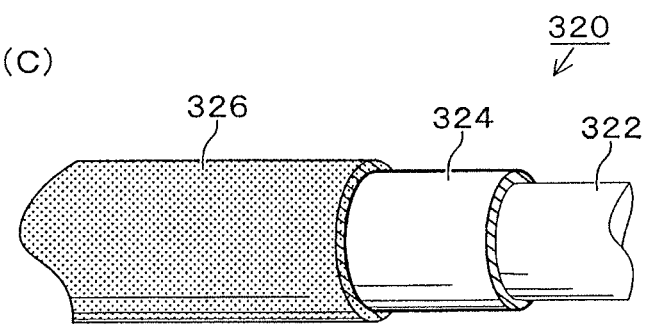
Figure 6:
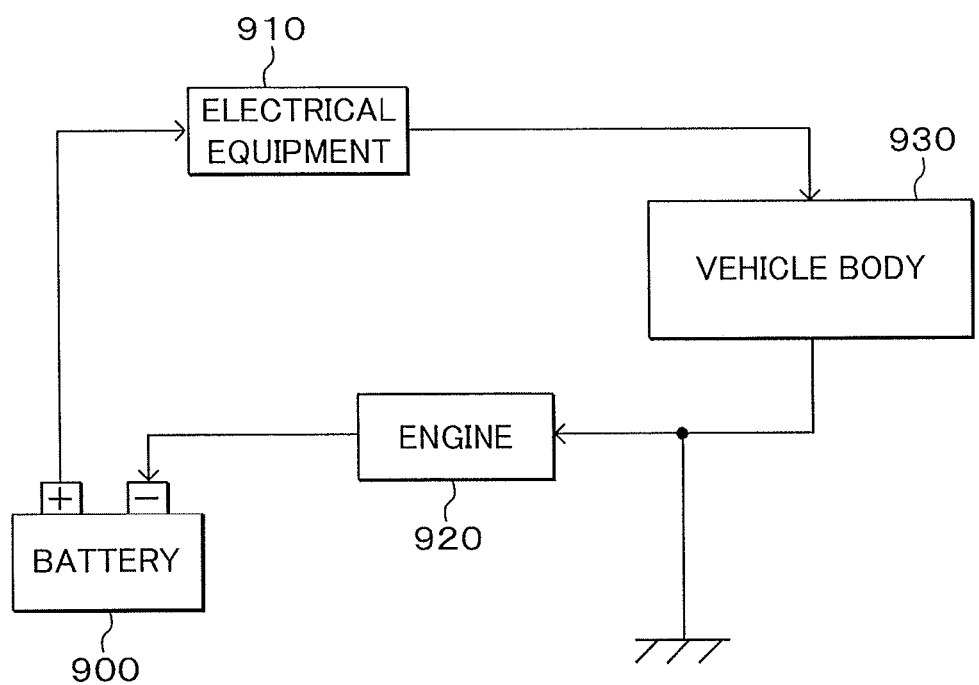
[FIG. 6] is a diagram showing a general electrical wiring in an automobile.

Reference being now made to FIG. 5, a fourth embodiment of the present invention will be described. In this embodiment 4, as shown in FIG. 5(A), there is provided another charge supplier 300 which comprises a bolt 302 and a germanium chip 10 or 14 embedded in the shaft portion of that bolt. FIG. 5(B) shows still another charge supplier 310 which comprises a bolt 312 and the germanium chips 10 or 14 secured in the head of the bolt 312. As illustrated, the germanium chips 10 or 14 are partially exposed from the head of the bolt. But, of course, to avoid such exposure, the germanium chips may be embedded within that head of bolt.

The above-described modes of charge suppliers 300 and 310 may serve as a substitute for existing bolt(s) and therefore can readily be used for mounting and charge-reduction purposes. For example, either of the charge supplier 300 and 310 may be used in place of the previously mentioned bolt-and-nut means 76 or 84 shown in FIG. 2(B), in which case, the charge supplier 60 may be omitted. Of course, the charge supplier 60 may not be omitted and used together with either of the charge suppliers 300 and 310. Further, instead of the illustrative mode of bolt, the germanium chips may be secured to (or embedded in) a nut, a cap or any other suitable part and element.

FIG. 5(C) shows another mode of charge supplier 320, which is basically composed of an electrically conductive element 322 and a germanium film 324 formed on the surfaces of that conductive element by coating or plating. In the case of such charge supplier being formed as a solid wire, a protective resin film 326 may be formed on the outer surfaces thereof. Or, a plurality of the electrically conductive elements 322, each having the germanium film 324 formed thereon, may be twisted together to provide a stranded wire of the conductive elements. Any one of those modes of charge suppliers 320 may serve as a substitute for existing cable and can readily be used for wiring and charge-reduction purposes. In this context, the illustrated charge supplier is of a circular shape in section as viewed crosswise to the longitudinal direction of the electrically conductive element 322, but instead thereof, the electrically conductive element 322 may be formed in the shape of plate, which has a rectangular shape in section as viewed crosswise to the longitudinal direction thereof. Also, the germanium film 324 may be formed on that conductive plate element 322.

It should be noted that the present invention is not particularly limited to the above-described embodiments, but any modification and change may be applied thereto in various ways, without departing from the gist of the invention as well as from the scopes of the appended claims. For example, such modification and change include the following points.

(1) Each of the configurations of charge suppliers described in the foregoing embodiments is just one exemplary mode of the present invention. As required, the shape of the charge supplier may be changed in any desired fashion. Also, the number of the germanium chips to be mounted may be increased or decreased appropriately. Further, the terminal portion of the charge supplier, which is an attaching part, may be modified as required.

(2) In the foregoing embodiments, germanium is used as an element for supplying a negative charge. But, any other semiconductor, such as silicon, may be used for that purpose. In particular, as a more preferred element for supplying a negative charge, a n-type semiconductor is recommended. Likewise, other elements and members than the germanium, which have been described in the foregoing embodiments, may also be replaced by any suited one of various known materials.

(3) The foregoing embodiments indicate attachment of the charge supplier to the battery, oil pan and radiator. However, those parts to which the charge supplier is to be attached are not limitative, and therefore the charge supplier may be attached to any other required part. For example, the charge supplier be attached to an oil filter, a wheel nut, a brake pad, an alternator, a spark plug, or a spark plug cap. Further, the charge supplier be disposed in a transmission oil or a differential gear oil. In addition to the oil, the charge supplier may also be applied to any liquid that will be electrically charged.

(4) While all the foregoing embodiments indicate use of the present invention with a car, it is to be noted that the invention is applicable to any other vehicle than such kind of passenger automobile, wherein the vehicle includes: a bus; a truck: a service vehicle including tractor crane; a motorcycle; and a bicycle. Further, the invention may be applied to a railway and/or rail car, a vessel, or an airplane, for instance. In particular, the invention is well suited for any equipment and appliance that have battery provided therein.

(5) Additionally, each of all the embodiments applied to the car is just an example, and the present invention is also effectively applicable to all electrically related appliances including: a direct-current power supply; an alternate-current power supply; a power line; and a signal line for transmitting digital and analog signals (or data line). For example, the invention is applicable to a circuit board in an electrical equipment. In other word, the charge supplier of the present invention can be attached to any location or article in which current passes, with a view to compensating for insufficient quantity of negative charge which will occur therein. Accordingly, as far as the present invention is concerned, various problems can be solved satisfactorily for improvement.

Industrial Applicability

In accordance with the present invention, it is possible to lessen an electrically charged state so effectively as to allow any associated component and element, such engine and electrical equipment, to operate in a smooth and satisfied way, so that the present invention may be applied to vehicle, vessel and so forth.

Description of Reference Numerals

| | |
|---|---|
| 10: | germanium chip |
| 12: | lead |
| 14: | germanium chip |
| 20: | copper plate |
| 22: | terminal |
| 30: | copper tape |
| 40, 60, 90: | charge suppliers |
| 50: | copper base plate |
| 52: | recessions |
| 54: | cover |
| 56: | terminal |
| 60: | charge supplier |
| 70: | battery |
| 72: | positive terminal |
| 74: | negative terminal |
| 75: | metallic connector |
| 76: | bolt and nut means |
| 80: | cable |
| 82: | terminal |
| 84: | bolt and nut means |
| 90: | charge supplier |
| 100: | charge supplier |
| 110: | drain plug |
| 120: | germanium bar |
| 122: | conductive core portion |
| 124: | germanium film |
| 130: | oil pan |
| 132: | oil |
| 140: | screw |
| 142: | cable |
| 200: | charge supplier |
| 210: | radiator cap |
| 212: | radiator |
| 214: | screw |
| 216: | cable |
| 220: | germanium bar |
| 230: | alternator |
| 300, 310: | charge suppliers |
| 302: | bolt |
| 310: | charge supplier |
| 312: | bolt |
| 320: | charge supplier |
| 322: | electrically conductive element |
| 324: | germanium film |
| 326: | resin film |
| 900: | battery |
| 910: | electrical equipment |

-continued

| | |
|---|---|
| 920: | engine |
| 930: | vehicle body |

The invention claimed is:

1. A charge supplier, comprising:
conductive elements, at least one of which has an attaching terminal; and
at least one n-type semiconductor chip,
wherein an entirety of the at least one n-type semiconductor chip is sandwiched between the conductive elements so that a negative charge counteracting a positive charge is discharged from the at least one n-type semiconductor chip, and
the charge supplier connects with a current passage portion of an electrical appliance and/or equipment.

2. A charge supplier according to claim 1, wherein said at least one n-type semiconductor chip is either a germanium or a germanium covered with a lead.

3. A charge supplier according to claim 1, wherein the attaching terminal connects with a negative terminal of a battery.

4. A charge supplier according to claim 1, wherein the conductive elements are made of copper.

5. A charge supplier according to claim 1, wherein the conductive elements are formed by one plate bent to sandwich the n-type semiconductor chip.

6. A charge supplier, comprising:
a current passage portion;
a conductive mounting/connecting element electrically connected with a predetermined object, present on the current passage portion; and
at least one n-type semiconductor chip present in or on the conductive mounting/connecting element so that a negative charge counteracting a positive charge is discharged from the at least one n-type semiconductor chip,
wherein the charge supplier connects with the current passage portion of an electrical appliance and/or equipment.

7. A charge supplier according to claim 6, wherein said conductive mounting/connecting element comprises a bolt, a nut, and a cap.

8. A charge supplier according to claim 6, wherein said at least one n-type semiconductor chip is either a germanium or a germanium covered with a lead.

9. A charge supplier according to claim 6, wherein the at least one n-type semiconductor chip is embedded in the conductive mounting/connecting element.

10. A charge supplier, comprising:
an element containing a liquid which is electrically charged therein;
a conductive mounting/connecting element present on the element; and
an n-type semiconductor extending from the conductive mounting/connecting element and immersed in the liquid so that a negative charge counteracting a positive charge is discharged from the n-type semiconductor;
wherein the charge supplier connects with a current passage portion of an electrical appliance and/or equipment.

11. A charge supplier according to claim 10, wherein said conductive mounting/connecting element comprises a bolt, a nut, and a cap.

12. A charge supplier according to claim 10, wherein said n-type semiconductor is either a germanium or a germanium covered with a lead.

13. A charge supplier according to claim 10, wherein the n-type semiconductor comprises a germanium bar comprising a conductive core and a germanium film covering the conductive core.

14. A charge supplier according to claim 13, wherein
the element is an oil pan storing an engine oil, and
the liquid is the engine oil.

15. A charge supplier according to claim 13, wherein
the element is a radiator,
the liquid is a coolant water, and
the germanium bar is fixed on a radiator cap of the radiator.

* * * * *